US007489077B2

(12) United States Patent
Kimura et al.

(10) Patent No.: US 7,489,077 B2
(45) Date of Patent: Feb. 10, 2009

(54) MULTI-ANODE TYPE PHOTOMULTIPLIER TUBE

(75) Inventors: Suenori Kimura, Hamamatsu (JP); Takayuki Ohmura, Hamamatsu (JP); Teruhiko Yamaguchi, Hamamatsu (JP); Masuo Ito, Hamamatsu (JP)

(73) Assignee: Hamamatsu Photonics K.K., Hamamatsu (JP)

(*) Notice: Subject to any disclaimer, the term of this patent is extended or adjusted under 35 U.S.C. 154(b) by 970 days.

(21) Appl. No.: 10/807,292

(22) Filed: Mar. 24, 2004

(65) Prior Publication Data

US 2007/0182325 A1 Aug. 9, 2007

(51) Int. Cl.
*H01J 31/50* (2006.01)
*H01J 43/04* (2006.01)
*G01T 1/20* (2006.01)

(52) U.S. Cl. ....................... 313/540; 313/535; 313/533; 313/532; 250/214 VT; 250/367

(58) Field of Classification Search ................. 313/532, 313/533, 540, 103 R, 103 CM; 250/214 VT, 250/367
See application file for complete search history.

(56) References Cited

U.S. PATENT DOCUMENTS 4,881,008 A * 11/1989 Kyushima et al. ........... 313/532
4,956,576 A 9/1990 L'Hermite
5,126,629 A 6/1992 Chopy
5,416,382 A 5/1995 L'Hermite
5,598,060 A 1/1997 l'Hermite
5,689,152 A 11/1997 Boutot et al.
6,198,221 B1 * 3/2001 Suyama et al. .............. 313/542

FOREIGN PATENT DOCUMENTS

JP A 55-39171 3/1980
JP A 57-194445 11/1982
JP A 59-14244 1/1984
JP A 63-261664 10/1988
JP A 2-291656 12/1990
JP A 3-173056 7/1991

(Continued)

OTHER PUBLICATIONS

T. Yamashita et al., "New Dual Rectangular Photomultiplier Tube for Positron CT", Proceedings, vol. 3, International Workshop on Physics and Engineering in Medical Imaging, pp. 209-211, Mar. 15-18, 1982.

*Primary Examiner*—Joseph L Williams
(74) *Attorney, Agent, or Firm*—Oliff & Berridge, PLC

(57) ABSTRACT

A glass container has a faceplate, a side tube, and a bottom. A photocathode is formed on the inner side of the faceplate. The glass container includes a partitioning wall, a shield electrode, a first dynode, a second dynode, a dynode array, and an anode. The partitioning wall has a cross shape to divide an electron focusing space into four space segments. The shield electrode is provided to shield the second dynode from the photocathode. A Venetian blind type of dynodes is provided as the dynode array. The first dynode, the second dynode, the dynode array, and the anode are maintained at the potential which is higher than that of the photocathode. Electrons emitted from the photocathode in response to incident light thereon efficiently impinge on the dynodes regardless of where the electrons are emitted. The electrons are multiplied and then detected by the anode.

11 Claims, 10 Drawing Sheets

FOREIGN PATENT DOCUMENTS

| | | |
|---|---|---|
| JP | A 5-36372 | 2/1993 |
| JP | A 6-111757 | 4/1994 |
| JP | A 6-150876 | 5/1994 |
| JP | A 7-192686 | 7/1995 |
| JP | A 7-245078 | 9/1995 |
| JP | A 8-306335 | 11/1996 |
| JP | B2 2801266 | 7/1998 |
| JP | A 11-250853 | 9/1999 |

* cited by examiner

MULTI-ANODE TYPE PHOTOMULTIPLIER TUBE

TECHNICAL FIELD

The present invention relates to a multi-anode type photomultiplier tube.

BACKGROUND ART

The Japanese Patent Unexamined Application Publication 6-111757 (designated as Document 1 hereinbelow) describes a photomultiplier with N number of independent electron multiplying portions disposed around a center axis. The photomultiplier includes a hermetically sealed container having a symmetrical structure along the longitudinal axis. The photomultiplier has a photocathode formed on the inner surface of the hermetically sealed container and a first dynode. The first dynode divides photoelectrons emitted from the photocathode into the N number of electron multiplying portions in accordance with the position on the photocathode which emits the photoelectron.

The first dynode has a cup shape with a flat bottom and a side face that extends towards the photocathode. The first dynode has a symmetric axis which substantially coincides with the longitudinal axis of the hermetically sealed container. The electron multiplying portion consists of sheet-type electron multipliers. An electrode is provided near a center on the bottom of the first dynode, and is maintained at the substantially same potential as that of the photocathode.

The Japanese Patent Unexamined Application Publication 7-192686 (designated as Document 2 hereinbelow) describes a photomultiplier tube with at least two space segments. This photomultiplier tube has a hermetically sealed container with a photocathode being formed inside. The hermetically sealed container includes a portion corresponding to a focusing electrode for focusing photoelectrons emitted from the photocathode and another portion corresponding to a first dynode performing the initial multiplication of photoelectrons.

The portion corresponding to the focusing electrode is separated from the portion corresponding to the first dynode by a flat plate. The flat plate has holes corresponding to each segment. The hole has a grid. A center partitioning wall having a flat surface that includes the center axis of the hermetically sealed container is provided on the opposite side to the side of the flat plate facing the photocathode. A second and higher order input dynodes are provided in the vicinity of the opposite side to the side of the center partitioning wall that faces the photocathode. A transverse rod is positioned at the center of the hermetically sealed container that includes the center axis. And the rod is parallel and distant away from the flat plate. The transverse rod is insulated from the electrode and maintained at the potential that is identical or similar to that of the photocathode.

The Japanese Patent Unexamined Application Publication 8-306335 (designated as Document 3 hereinbelow) describes a multi-channel type electron multiplier tube. The electron multiplier tube is provided with sheet-like dynodes having control electrodes between dynode sheets to control the gain of specific channels.

This multi-channel electron multiplier tube is provided with a hermetically sealed container having a photocathode on the inner surface, and cross-shaped projections between each channel. These projections are maintained at the same potential as that of the photocathode.

The Japanese Patent Unexamined Application Publication 11-250853 (designated as Document 4 hereinbelow) describes a photomultiplier tube in which an electron convergence space is divided into a plurality of segments by a partition plate. The partition plate in this photomultiplier tube extends from a position near the photocathode formed on the inner surface of the hermetically sealed container to the surface that includes the center axis of the hermetically sealed container. The partition plates have the same potential as the photocathode. Each segment is provided with a plurality of dynodes for multiplying electrons.

DISCLOSURE OF THE INVENTION

The first dynode in the photomultiplier tube described in Document 1 has a cup shape. An electrode disposed near the center of the bottom of the first dynode is maintained at the same potential as that of the photocathode and is used to adjust the electric field inside the photomultiplier tube, thereby ensuring that electrons emitted from the photocathode and secondary electrons emitted from the first dynode impinge on the first dynode and other higher order dynodes which are sheet types.

The photomultiplier described in Document 2 has an electrode that functions as the focusing electrode and the first dynode to cause electrons emitted from the photocathode to impinge on the first dynode. Secondary electrons emitted from the first dynode are guided to the second and higher order input dynodes by using the effects of the center partitioning wall and potential differences between the first dynode and the second and higher order input dynodes.

In the photoelectron multiplier tube described in Document 3, a control electrode is provided between the dynode sheets in order to control the gain of specific channel of the sheet type dynode. Cross-shaped projections with the same potential as that of the photocathode are provided between each channel to cause electrons to impinge on the dynodes.

In the photomultiplier described in Document 4, a partition plate with the same potential as that of the photocathode is disposed between a plurality of segments to adjust the electric field inside the photomultiplier, thereby causing electrons to impinge on the dynodes.

However, electrons emitted from some areas of the photocathode in the photomultiplier tubes described above do not effectively strike the first dynode. Especially, the some electrons emitted from the periphery of the photocathode or some secondary electrons emitted from the periphery of the first dynode may pass through without impinging on the first, second, and/or higher order dynodes.

In this case, the effective area of the photocathode is reduced, and effective sensitivity is lowered. In addition, output signals in the photocathode are not uniform, which leads to loss of sharpness at the edges of an image when the device is used for image processing.

In order to solve the above problems, the present invention is characterized in that a multi-anode type photomultiplier tube comprises a faceplate made from glass; a side tube made from glass and having a hollow shape extending along a tube axis which is substantially perpendicular to the faceplate, the side tube being joined to one surface of the faceplate; a photocathode formed on an inner region of the one surface of the faceplate in the side tube to emit a photoelectron in response to light incident on the faceplate; a partitioning wall having a predetermined length extending from a boundary of a plurality of regions on the faceplate along a tube axial direction; a plurality of electron multiplying portions provided in the side tube, the plurality of electron multiplying portions corresponding to the plurality of regions on the faceplate for multiplying the photoelectron emitted from the photocathode; and a plurality of anodes provided in the side tube, the plurality of anodes corresponding to the plurality of regions on the photocathode for receiving an electron emitted from the plurality of electron multiplying portions. Each of the electron multiplying portion includes: a first dynode provided in the vicinity of the side tube in the side tube for multiplying the photoelectron impinging thereon from the photocathode to emit a secondary electron; a second dynode provided in the vicinity of the tube axis in the side tube for multiplying the secondary electrons impinging thereon from the first dynode to emit secondary electrons; and a plurality dynodes in the side tube for multiplying the secondary electrons impinging thereon from the second dynode in turn to emit secondary electrons; wherein the multi-anode photomultiplier tube further comprises: a shield electrode provided between the second dynode and the photocathode for shielding the second dynode from the photocathode; the photocathode, the partitioning wall, and the shield electrode are maintained at a same potential.

In the above multi-anode type photomultiplier tube, the photocathode emits photoelectrons in response to light incident thereon. The plurality of electron multiplying portions are provided in the multi-anode type photomultiplier tube. The partitioning wall is provided from the position on the photocathode corresponding to the borders between the plurality of electron multiplying portions in the tube axial direction by a predetermined length. The electron multiplying portion includes the first dynode, the second dynode, and the plurality of dynodes. The first dynode is provided in the vicinity of the side tube. The second dynode is provided in the vicinity of the tube axis. The shield electrode is provided between the second dynode and the photocathode to shield the second dynode from the photocathode. The photocathode, the partitioning wall, and the shield electrode are maintained at the same potential, so that an electric field in the side tube is adjusted. Accordingly, the photoelectrons are guided to the first dynode effectively regardless of the positions on the photocathode thereof.

Preferably, a flat electrode having an aperture to enable the electrons to pass through to the first dynode can be provided between the shield electrode and the second dynode. The aperture can be covered with an electrically conductive member. Preferably, the flat electrode is maintained at the potential which is higher than that of the first dynode and less than that of the second dynode.

According to the above structure, the electric field generated between the photocathode and the first dynode can be adjusted, so that the electrons emitted from the periphery of the photocathode can be guided to the first dynode effectively.

Further, the electric field to guide the secondary electrons emitted from the first dynode to the second dynode is generated between the first dynode and the second dynode. Accordingly, the electrons can be guided to the second dynode effectively.

Preferably, the shield electrode is provided with an aperture to adjust the electric field in the side tube, so that the transit time differences among the electrons which are emitted from the photocathode to travel to the first dynode can be reduced.

According to the above structure, the time required for the electron to impinge on the first dynode can be made uniform regardless of the position on the photocathode from which the electron is generated.

As described above, even electrons generated at the periphery of the photocathode in the multi-anode type photomultiplier tube can be detected with the same sensitivity as that of the center portion without any time differences. When the photomultiplier tube is used for an image processing, a sharp image can be obtained.

BEST MODE FOR CARRYING OUT THE INVENTION

Figure 1:
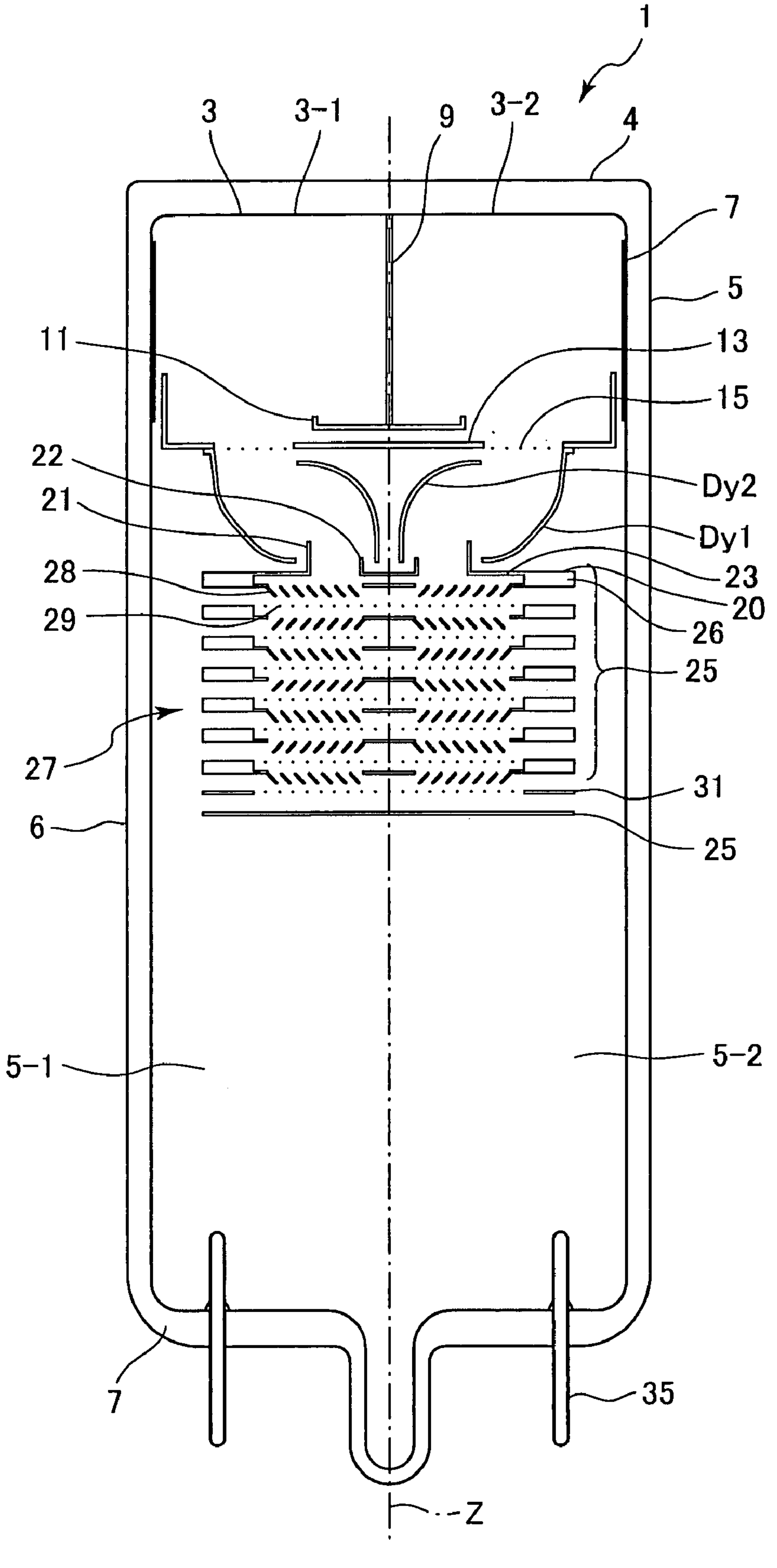
FIG. 1 is a cross-sectional view of a multi-anode type photomultiplier tube 1 according to the first embodiment of the present invention taken along the line A-A' of in FIG. 2.

A multi-anode type photomultiplier tube 1 according to the first embodiment of the present invention will be described while referring to the drawings.

First, the configuration of the multi-anode type photomultiplier tube 1 is described referring to FIGS. 1 to 4. As shown in FIG. 1, the multi-anode type photomultiplier tube 1 is a 2×2 multi-anode type photomultiplier tube. The multi-anode type photomultiplier tube 1 has a substantially quadratic prism glass container 5. The glass container 5 is made from transparent glass. Referring to FIG. 1, the glass container 5 has a faceplate 4 for receiving light incident on an upper surface.

The faceplate 4 has a photocathode 3 formed on an inside surface thereof. A side surface of the glass container 5 extends along a tube axis Z which is substantially perpendicular to the faceplate 4, so that the glass container 5 has a hollow side tube 6. I/O pins 35 are provided at a bottom 7 of the glass container 5. The faceplate 4, the side tube 6, and the bottom 7 are integrated together to hermetically seal the glass container 5.

An aluminum thin film 7 is vapor deposited on an upper inner surface of the side tube 6 of the glass container 5. The aluminum thin film 7 is maintained at the same potential as that of the photocathode 3. An outer surface of the side tube 6 of the glass container 5 is provided with a magnetic shield (not shown) made from a magnetic material such as permalloy and is further covered with a tube made from a resin.

A partitioning wall 9, a shield electrode 11, a flat electrode 13, a mesh 15, a first dynode Dy1, a second dynode Dy2, a first screen 21, a second screen 22, a flat plate 23, a dynode array 25 and an anode 31 are provided in the glass container 5. The first dynode Dy1, the second dynode Dy2, the screen focusing electrode 20, and the dynode array 25 function as the electron multiplying portion.

The photocathode 3, the shield electrode 11, the flat electrode 13, the first dynode Dy1, the second dynode Dy2, the dynode array 25, and the anode 31 inside the glass container 5 are electrically connected to the I/O pins 35 by wires (not shown). Each of the above components is maintained at a predetermined potential.

Figure 2:
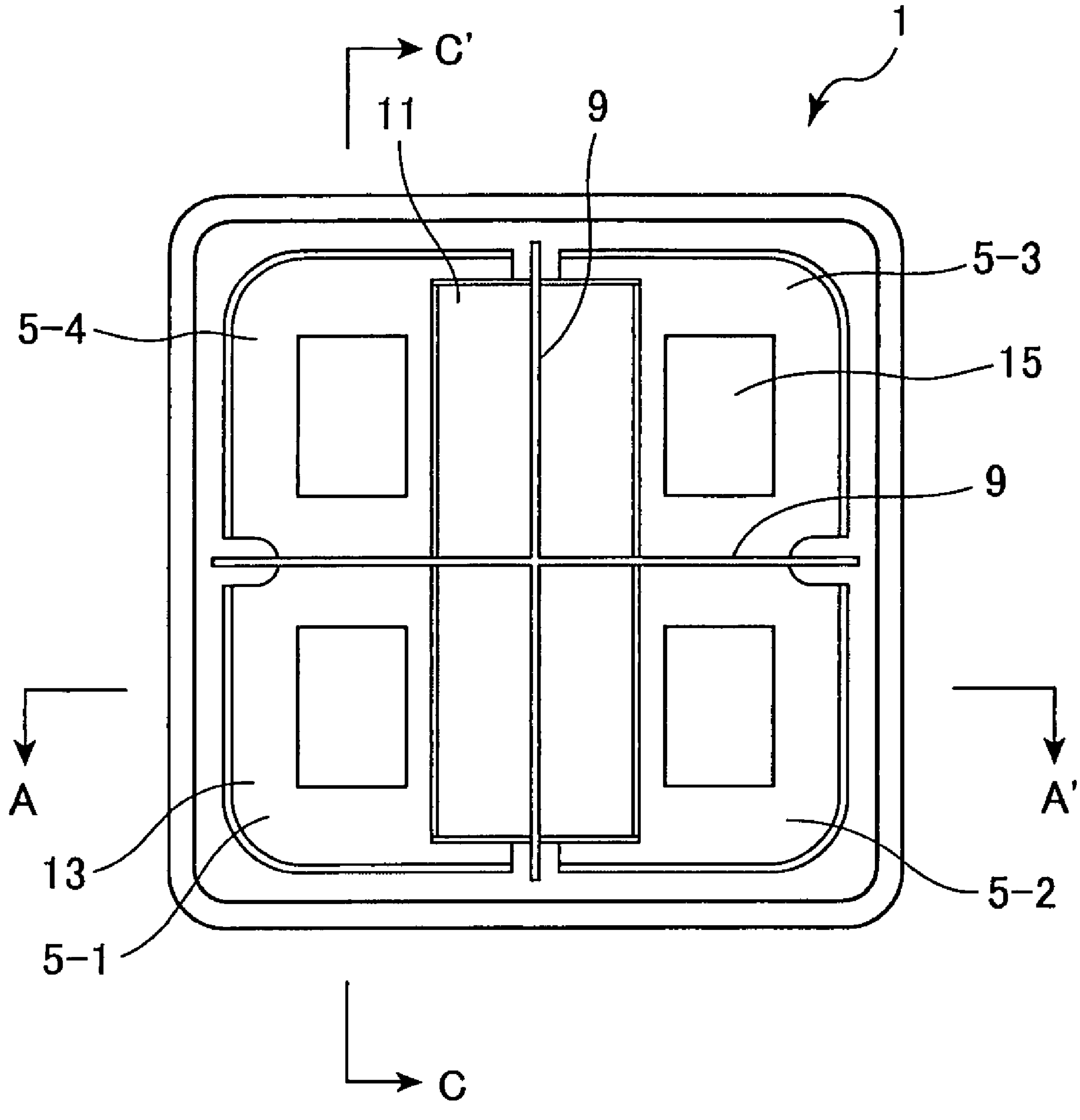
FIG. 2 is a plan view showing the multi-anode type photomultiplier tube 1 from above.
Figure 3:
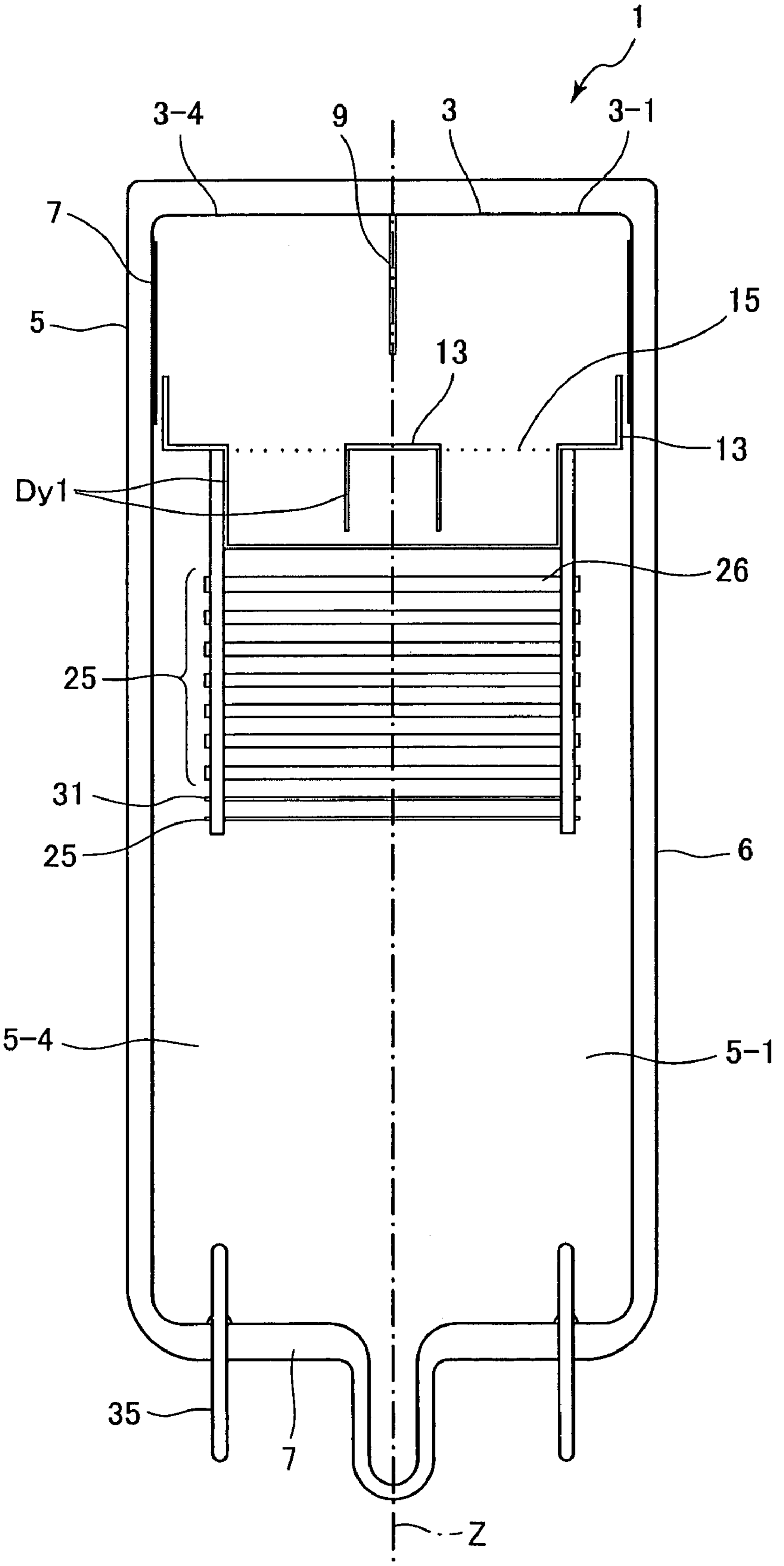
FIG. 3 is a cross-sectional view of the multi-anode type photomultiplier tube 1 taken along the line C-C' in FIG. 2.

The partitioning wall 9 is made from a conductive material and extends from the photocathode 3 along the axis Z. As shown in FIG. 2, the partitioning wall 9 has a cross shape as seen from above and divides an electron focusing space into four space segments 5-1 to 5-4 in the glass container 5. As shown in FIG. 1, the bottom part of the partitioning wall is electrically connected to the shield electrode 11. The partitioning wall 9 is maintained at the same potential as that of the photocathode 3.

The shield electrode 11 is made from a flat conductive material and is disposed below the partitioning wall 9 in the glass container 5 to prevent the second dynode Dy2 from facing the photocathode 3. In the embodiment shown in this figure, the shield electrode 11 has a rising portion from a peripheral edge that extends toward the photocathode 3 in order to reinforce the shield electrode 11. The shield electrode 11 is maintained at the same potential as that of the photocathode 3.

As shown in FIG. 2, the flat electrode 13 is provided with apertures and disposed beneath the shield electrode 11 to cover a cross section of the glass container 5. The flat electrode 13 has a rising portion on the peripheral edge that extends towards the photocathode 3. In the embodiment shown in the figure, four apertures are formed around the center axis Z in a (2×2) array manner in the flat electrode 13. Electrons emitted from photocathode segments 3-1 to 3-4 corresponding to the space segments 5-1 to 5-4, respectively, are able to travel through the respective aperture.

The flat electrode 13 is maintained at the same potential as that of the first dynode Dy1 or at a slightly higher potential than that of the first dynode Dy1 which does not exceed the potential of the second dynode Dy2.

The mesh 15 is placed in each of the apertures of the flat electrode 13. The mesh 15 is made from an electrically conductive mesh member. The mesh 15 is maintained at the same potential as that of the first dynode Dy1 or at a slightly higher potential than that of the first dynode Dy1 which does not exceed the potential of the second dynode Dy2.

The first dynode Dy1 is provided beneath each of the mesh 15. In other words, one first Dy1 dynode is displaced for each space segment 5-1 to 5-4, so that a total of four first Dy1 dynodes are placed in the glass container 5.

The first dynode Dy1 consists of a horizontal portion that extends straight in a horizontal direction, a vertical portion that extends straight in an axial direction, and a diagonal portion that extends diagonally to connect the horizontal and vertical portions. Each of the first dynodes Dy1 is disposed near the side tube 6 in the glass container 5 in order to face the corresponding photocathode 3-1 to 3-4 through the space segments 5-1 to 5-4. Note that the first dynode Dy1 is maintained at the potential that is higher than that of the photocathode 3 and lower than that of the anode 31.

The second dynode Dy2 consists of a horizontal portion that extends straight in the horizontal direction, a vertical portion that extends straight along the axial direction, and a diagonal portion that connects the horizontal and vertical portions and extends diagonally. The second dynode Dy2 is disposed near the axis Z in the glass container 5 to face the corresponding first dynode Dy1. Thus, one second dynode Dy2 is provided in each space segment 5-1 to 5-4 in the glass container 5, and a total of four second stage dynodes Dy2 is disposed.

Among the four second dynodes Dy2, the vertical portions of the two second dynodes in the space segments 5-1 and 5-2 are integrated together through their backs. Similarly, the vertical portions of the two second dynodes Dy2 in the space segment 5-3 and 5-4 are joined together through their backs. The second dynode Dy2 is maintained at the potential that is higher than that of the first dynode Dy1 and lower than that of the anode 31.

Figure 4:
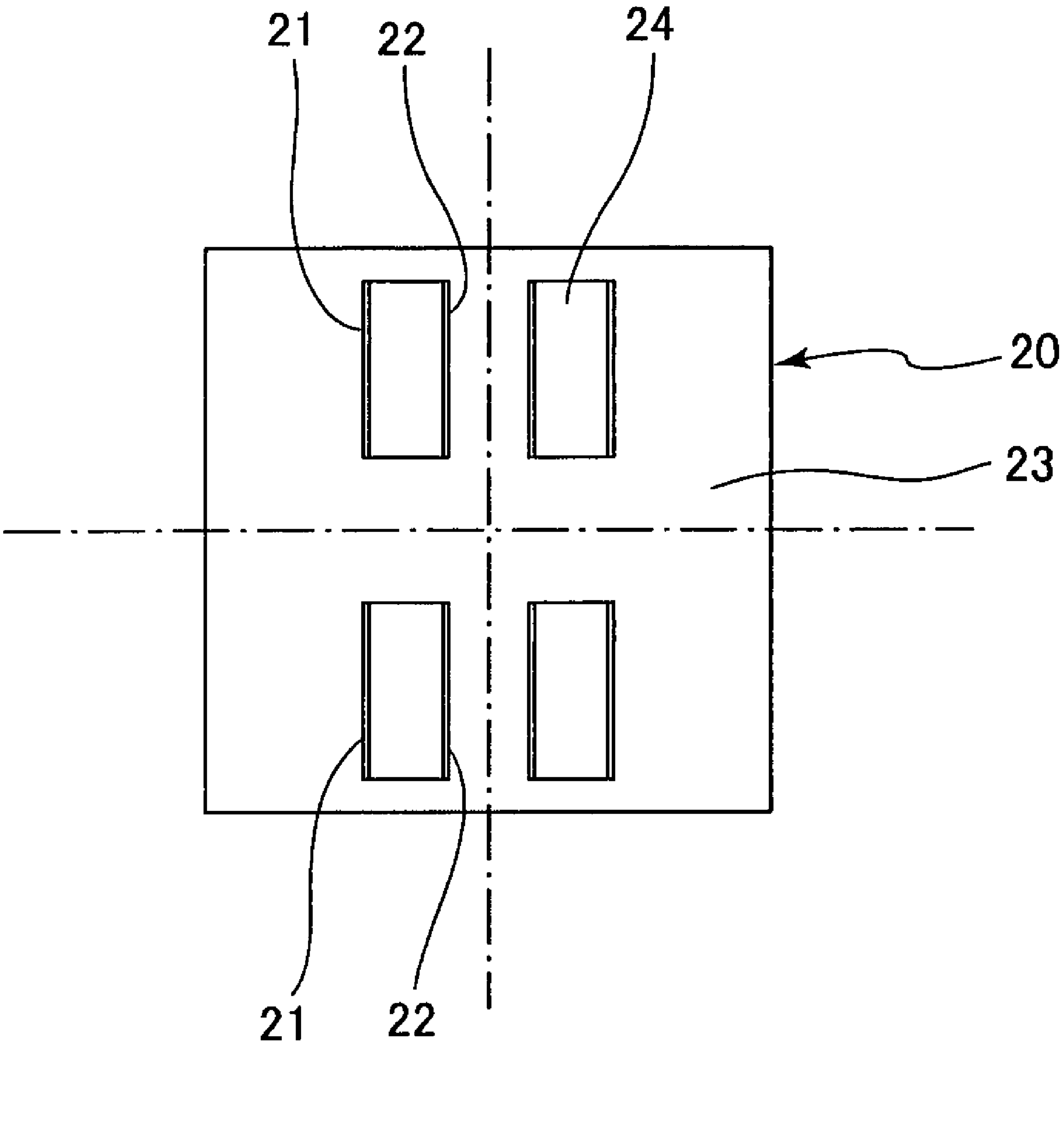
FIG. 4 is a top view of a screen focusing electrode 20 of the multi-anode type photomultiplier tube 1.

A screen focusing electrode 20 is provided between the dynode array 25 and the first and second dynodes Dy1, Dy2. As shown in FIG. 4, the screen focusing electrode 20 consists of first screens 21, second screens 22, a flat plate 23, and apertures 24.

The four apertures 24 are arranged around the axis Z in a 2×2 matrix manner so that each aperture faces the corresponding second dynode Dy2. The first screen 21 extending towards the photocathode 3 is formed at the periphery of the aperture 24 in the vicinity of the first dynode Dy1. The first screen 21 is placed in each segment 5-1 to 5-4 in the glass container 5, so that a total of four first screens 21 are placed. The first screen 21 preferably extends across the lower end of the first dynode Dy1 towards the photocathode 3.

The second screen 22 extending towards the photocathode 3 is formed at the periphery of aperture 24 in the vicinity of the second dynode Dy2. The second screen 22 is formed in each segment 5-1 to 5-4 in the glass container 5, so that a total of four second screens 22 is formed. The second screen 22 extends above the lower end of the second dynode Dy2.

The dynode array 25 in the multi anode type photomultiplier tube 1 is a Venetian blind type. The dynode array consists of flat plate portions 26 and four dynode portions 27. The four dynode portions 27 correspond to the four apertures 24 and extend from the first screen 21 of the aperture 24 toward the side tube 6.

Each dynode portion 27 in the dynode array 25 is provided with a plurality of electrode elements 28. The electrode elements 28 in the third, fifth, seventh, and ninth dynodes Dy3, Dy5, Dy7 and Dy9 is inclined 45° with respect to the tube axis Z so that the secondary electron emission surface of the electrode element faces the second dynode Dy2. The electrode elements 28 in the fourth, sixth, and eighth dynodes Dy4, Dy6, and Dy8 are inclined 45° with respect to the axis Z in the opposite direction to those of the third, fifth, seventh and ninth dynodes Dy3, Dy5, Dy7 and Dy9.

The flat plate portions 26 of the third dynode Dy3 are integrated with the flat plate 23 so that the flat plate 23 is placed above the dynode portions 27. The mesh electrode 29 is integrated with the flat plate 26 of each of the fourth to the ninth dynodes Dy4 to Dy9 in order to be placed above the electrode elements 28.

One anode 31 is provided below each of the four ninth dynodes Dy9 in order to correspond to each of the four dynode portions. A tenth dynode Dy10 is provided below the anode 31. The tenth dynode Dy 10 emits secondary electrons towards the anode 31, when electrons emitted by the ninth dynode Dy9 impinge on the tenth dynode Dy10. When the electrons impinge on the anode 31 from the tenth dynode Dy10, the anode 31 detects the electrons.

The multi-anode type photomultiplier tube 1 having the configuration described above operates as follows.

A predetermined voltage is applied to the photocathode 3, the partitioning wall 9, the shield electrode 11, the flat electrode 13, the screen focusing electrode 20, the first dynode Dy1, the second dynode Dy2, the dynode array 25, and the anodes 31 via the I/O pins 35.

When light strikes any one of the space segments 5-1 to 5-4 on the faceplate 4, the corresponding one of the photocathode 3-1 to 3-4 emits the number of photoelectrons that corresponds to the amount of incident light. The emitted photoelectrons are converged by the partitioning wall 9, the shield electrode 11, and the flat electrode 13 in the corresponding space segment to pass through the corresponding mesh 15 and impinge on the first dynode Dy1.

The first dynode Dy1 emits secondary electrons in response to the photoelectrons impinging thereon. These secondary electrons are converged by the screen focusing electrode 20 to impinge on the second dynode Dy2.

Since the first screen 21 extends upwards across the lower end of the first dynode Dy1, the equipotential lines made by the first dynode Dy1 are raised upwards. These equipotential lines are brought closer to the horizontal portion rather than the diagonal portion of the second dynode Dy2. Therefore, a major part of the vertical and diagonal portions of the second dynode Dy2 is available for emitting secondary electrons.

The electrons emitted by the second dynode Dy2 travel to the third dynode Dy3 that is maintained at the higher potential than that of the second dynode Dy2. Since the second screen 22 protrudes upwards across the lower end of the second dynode Dy2, the electrons emitted from the second dynode Dy2 are efficiently guided to the aperture 24 in the screen focusing electrode 20.

The electrons that have passed through the aperture 24 impinge on the third dynode Dy3. The third dynode Dy3 extends beyond the aperture 24 towards the side tube 6 to efficiently capture the electrons passing through the aperture 24. The electrons are successively multiplied in the dynode array 25 to impinge on the anode 31.

The anode 31 generates a signal that corresponds to the number of impinging electrons and then outputs the signal to the outside of the glass container 5 via the I/O pins 35.

The shield electrode 11, the flat electrode 13, the screen focusing electrode 20, the first dynode Dy1, the second dynode Dy2, the dynode array 25, and the anode 31 are disposed in the glass container 5 of the multi-anode type photomultiplier tube 1. A magnetic shield is provided on the outer periphery of the glass container 5 to ensure that the converging and multiplying of photoelectrons can be accurately performed without any interference from external magnetic fields.

Next, the operations of the partitioning wall 9 and the shield electrode 11 will be described while referring to FIGS. 5 to 8.

Figure 5A:
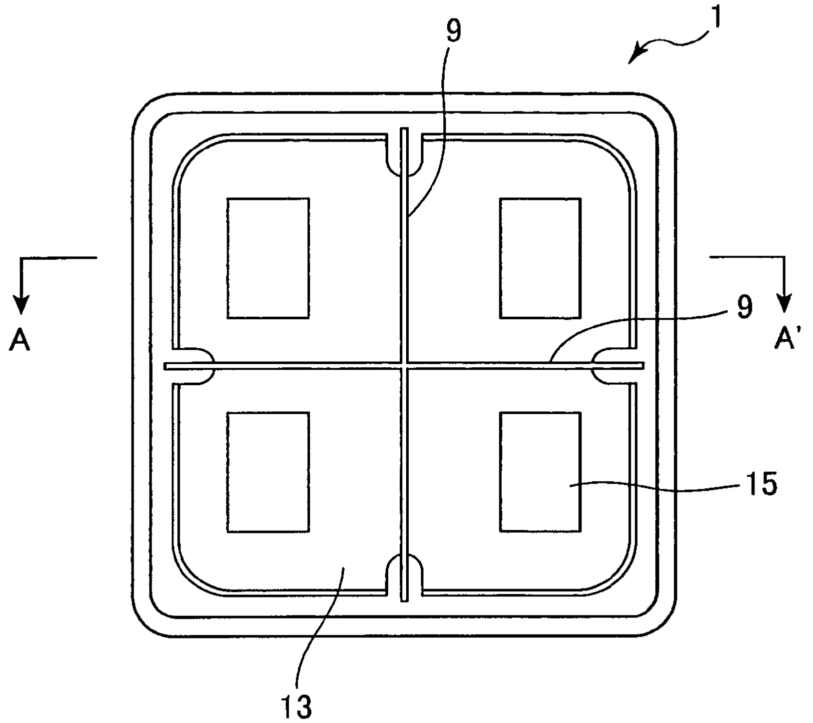
FIG. 5 shows electron trajectories in the multi-anode type photomultiplier tube 1 having a partitioning wall 9 and no shield electrode 11.
Figure 5B:
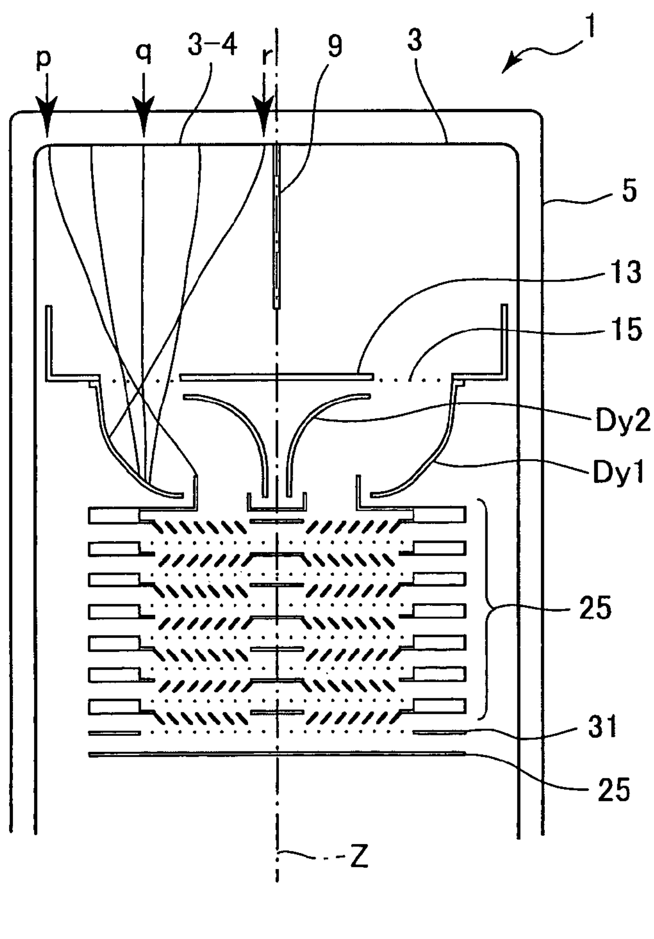

FIG. 5 shows electron trajectories in the multi-anode type photomultiplier tube 1 which has the partitioning wall 9 formed above the flat electrode 13 and no shield electrode 11. FIG. 5(*a*) is a plan view of the multi-anode type photomultiplier tube 1 from above, and FIG. 5(*b*) is a sectional view of the multi-anode type photomultiplier tube 1 taken along the line A-A' of FIG. 5(*a*). In FIG. 5, the trajectories q, r of the electron emitted from the positions in the vicinity of the center of the photocathode 3-4 and the tube axis Z reach the first dynode Dy1. When attention is given to the electron trajectory p, the electron emitted at the position on the photocathode 3-4 near the periphery of the side tube 6 deviates from the first dynode Dy1 to impinge on the first screen. When this phenomenon happens, light incident on the area on the photocathode 3-4 adjacent the periphery of the side tube 6 can not be detected effectively.

Figure 6A:
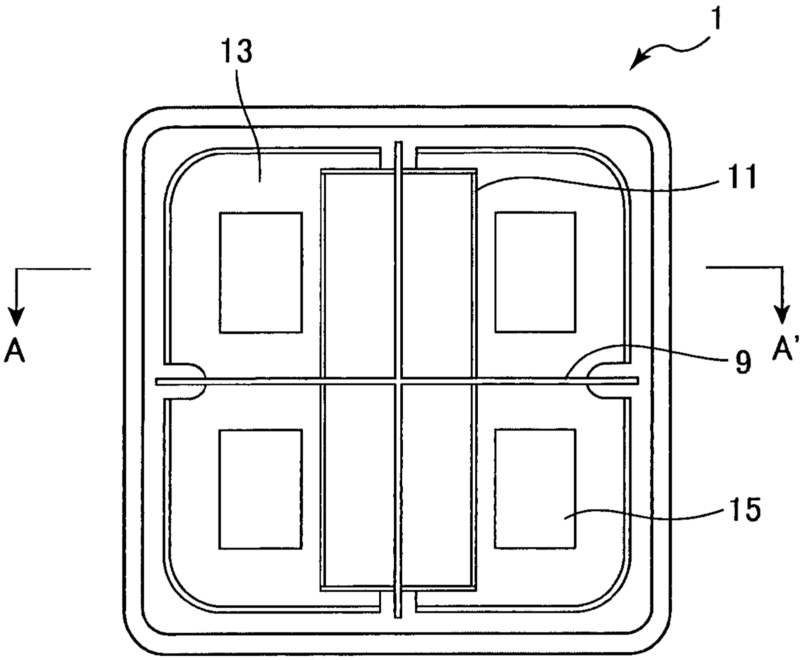
FIG. 6 shows electron trajectories in the multi-anode type photomultiplier tube 1 provided with a partitioning wall 9 and a shield electrode 11.
Figure 6B:
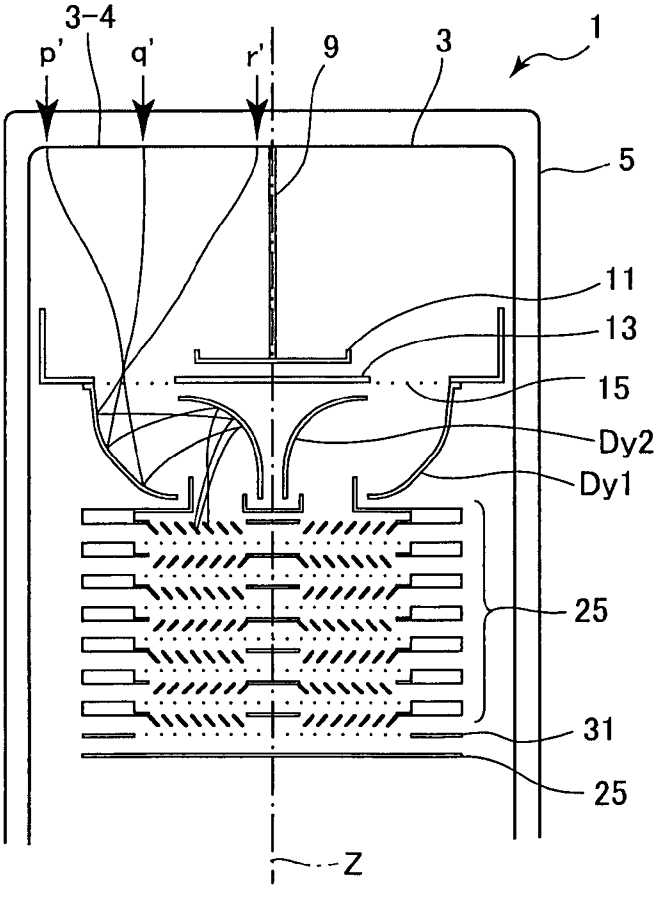

FIG. 6 shows electron trajectories in the multi-anode type photomultiplier tube 1 having a partitioning wall 9 and a shield electrode 11 formed above the flat electrode 13. FIG. 6(*a*) is a plan view of the multi-anode type photomultiplier tube 1 from above, and FIG. 6(*b*) is a sectional view taken along the line A-A' in FIG. 6(*a*). In FIG. 6, all electron trajectories p', q', and r' reach the first dynode Dy1. Additionally, the secondary electron emitted from the first dynode Dy1 in response to the electron impinging thereon impinges on the second dynode Dy2, and then passes through the aperture 24 to impinge on the dynode array 25.

The photomultiplier tube having the above structure enables electrons to impinge on the first dynode Dy1 effectively regardless of the position of the light incident on the photocathode 3-4. Therefore, the incident light on the entire surface of the photocathode 3 can be detected uniformly.

Figure 7A:
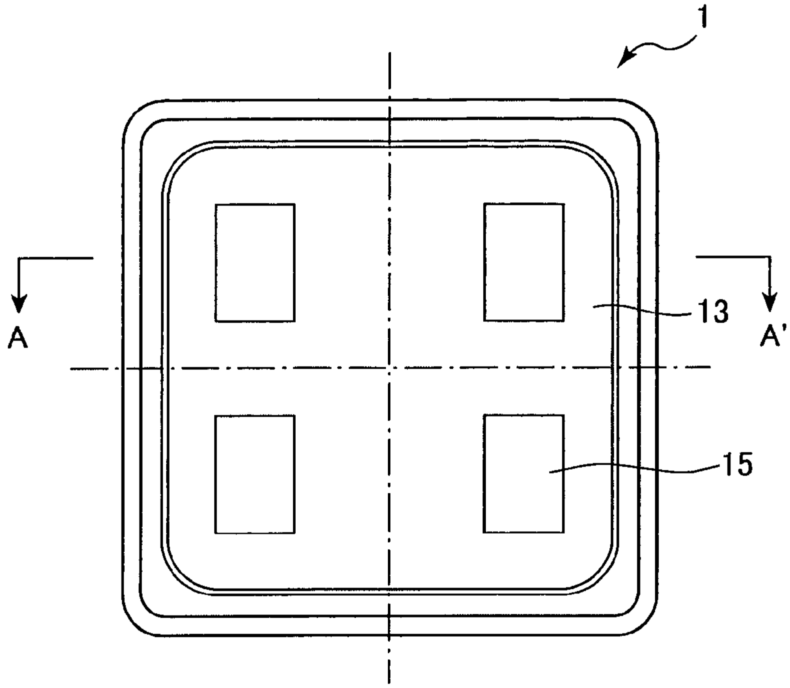
FIG. 7 shows electron trajectories in the multi-anode type photomultiplier tube 1 without a partitioning wall 9 and a shield electrode.
Figure 7B:
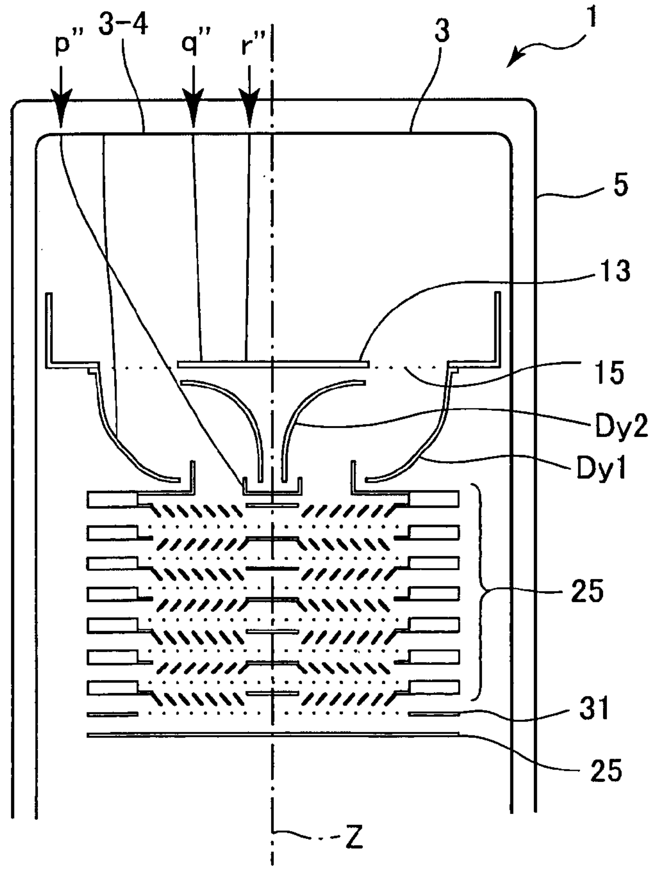

FIG. 7 shows electron trajectories in the multi-anode type photomultiplier tube 1 without a partitioning wall 9 and a shield electrode 11 as a comparison. FIG. 7(*a*) is a plan view of the multi-anode type photomultiplier tube 1 from above, and FIG. 7(*b*) is a sectional view taken along line A-A' of FIG. 7(*a*). The electron trajectory P" emitted from the position adjacent the side tube 6 on the photocathode 3-4 travels toward the second screen 22. Additionally, the electron trajectories r", q" emitted from the positions near the tube axis Z on the photocathode 3-4 collide with the flat electrode 13. Thus, the electron trajectories P", r", and q" do not impinge on the first dynode Dy1.

As described above, the multi-anode type photomultiplier tube according to the first embodiment is provided with the anode 31 and the electron multiplying portion including the first dynode Dy1, the second dynode Dy2, and the dynode array 25. The light incident on the photocathode 3 is multiplied by the electron multiplying portion and then detected by the anode 31. The partitioning wall 9 having a cross shape extends from the photocathode 3 along the tube axial direction Z. The shield electrode 11 is provided in order to shield the second dynode Dy2. The partitioning wall 9 and the shield electrode 11 are maintained at the same potential as that of the photocathode 3.

The above structure of the multi-anode type photomultiplier tube enables electrons emitted from the photocathode 3 in response to the light incident thereon to be guided to the electron multiplying portion such as the first dynode Dy1 and the second dynode Dy2 effectively regardless of the positions on the photocathode 3 which the light is incident on. Thus, the light incident on the photocathode 3 can be detected uniformly regardless of the incident positions on the photocathode 3. Accordingly, when the photomultiplier tube is used for an image displaying device, a clear image can be obtained.

Next, a multi-anode electron multiplier tube 100 of the second embodiment according to the present invention will be described while referring to FIGS. 8 to 10. The similar parts and components in this embodiment to those of the first embodiment will be designated with the same reference numerals.

Figure 8A:
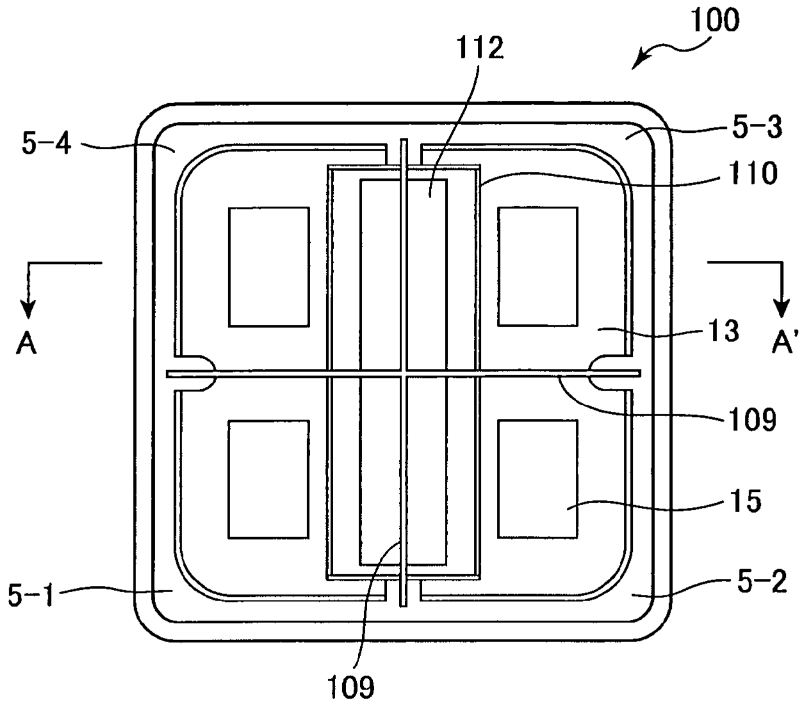
FIGS. 8(*a*) and (*b*) are a plan view and a sectional view showing the multi-anode type photomultiplier tube 100 according to the second embodiment of the present invention, respectively.
Figure 8B:
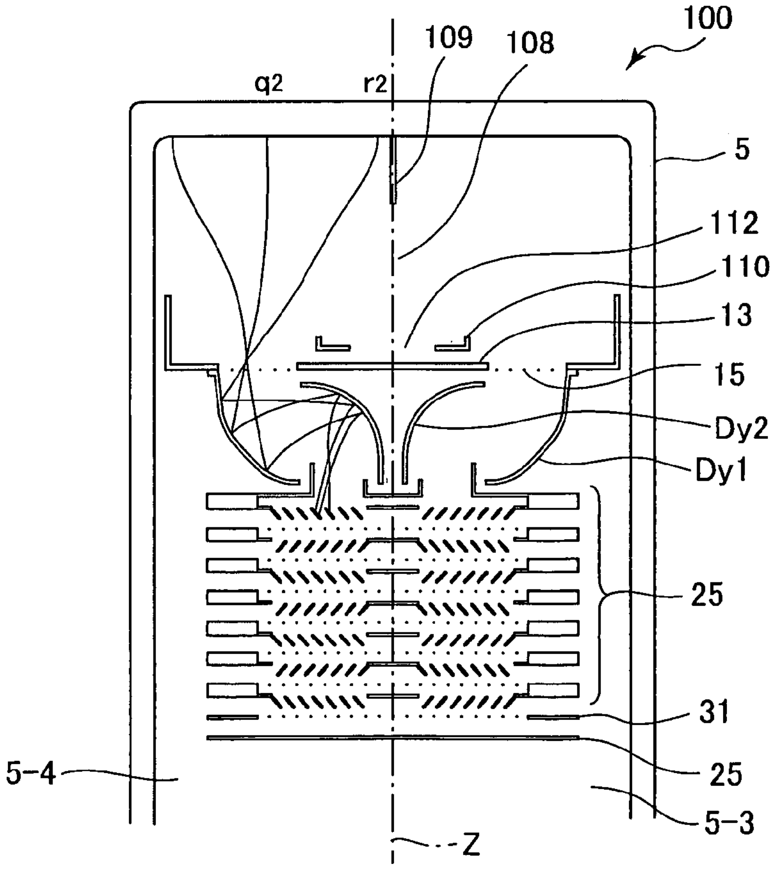

As shown in FIG. 8, the following components in the photomultiplier 100 are substituted for the corresponding components in the multi-anode type photomultiplier tube 1: a partitioning wall 109 is substituted for the partitioning wall 9, and a shield electrode 110 is substituted for the shield electrode 11.

The partitioning wall 109 is made from an electrically conductive material and extends from the photocathode 3 along the axis Z. As shown in FIG. 8, the partitioning wall 109 has a cross-shape, as seen from above. The partitioning wall divides an electron converging space in the glass container 5 into four space segments 5-1 to 5-4 as the partitioning wall 9 does. An opening space 108 is provided between the lower end of the partitioning wall 109 and the shield electrode 110. The partitioning wall 109 is maintained at the same potential as that of the photocathode 3.

The shield electrode 110 is made from an electrically conductive plate and disposed below the partitioning wall 109 and above the flat electrode 13 inside the glass container 5. As seen in the figure, a rise is provided at the periphery of the shield electrode 110 to rise towards the photocathode 3 and serves to reinforce the shield electrode 110. The shield electrode 110 is provided with an aperture 112 at the center. The aperture 112 has a rectangular shape from above. The shield electrode 110 is maintained at the same potential as that of the photocathode 3.

Other components have the same structure and function as the corresponding components in the multi-anode type photomultiplier tube 1.

Next, the effects of the partitioning wall 109 and the shield electrode 110 will be described while referring to FIGS. 8 and 9. FIG. 8(*a*) is a plan view of the multi-anode type photomultiplier tube 100 from above, and FIG. 8(*b*) is a sectional view taken along the line A-A' of FIG. 8(*b*).

As shown in FIG. 8, the opening space 108 below the partitioning wall 109 and the aperture 112 in the shield electrode 110 prevent the intensity of the electric field adjacent to the tube axis Z from weakening in the multi-anode photomultiplier tube 100. The time differences between the electron trajectories q2, r2 which travel from the photocathode 3 to the first dynode Dy1 are less than those of the electron trajectories q', r' in the multi-anode type photomultiplier tube 1 of FIG. 6.

Figure 9A:
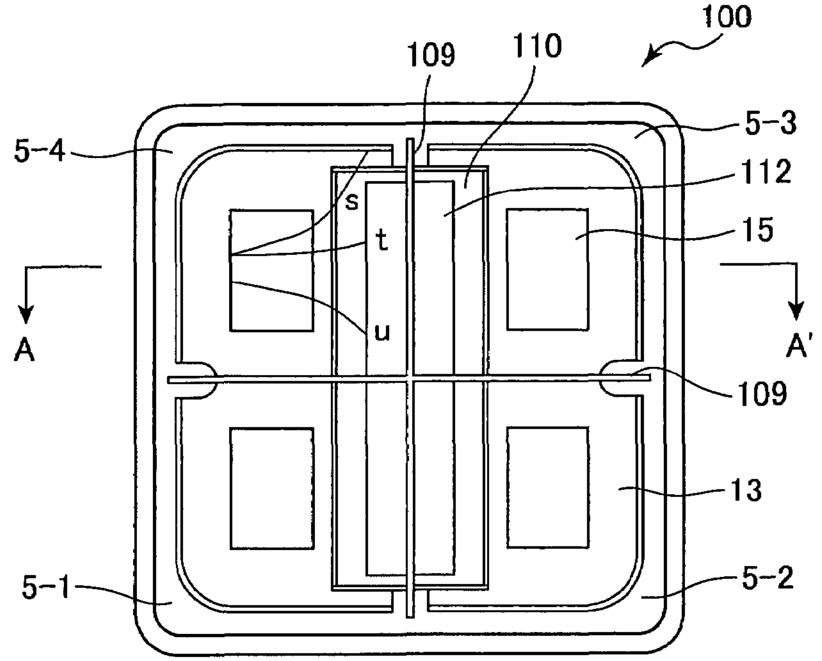
FIG. 9 shows electron trajectories in the multi-anode type photomultiplier tube 100 with a partitioning wall 109 and a shield electrode 110.
Figure 9B:
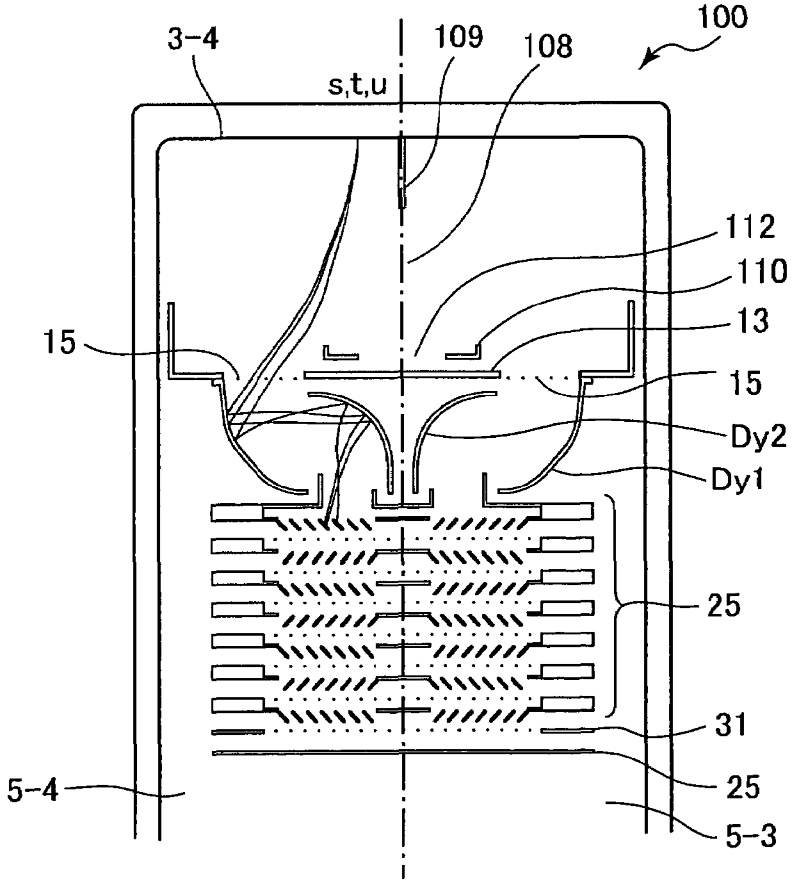

FIG. 9 shows electron trajectories in the multi-anode type photomultiplier tube 100 with a partitioning wall 109 and a shield electrode 110 provided above the flat electrode 13. FIG. 9(*a*) is a plan view of the multi-anode type photomultiplier tube 100 from above, and FIG. 9(*b*) is a sectional view taken along the line A-A' of FIG. 9(*a*).

FIG. 9 shows electron trajectories s, t, and u in the space segment 3-4 drawn from the point on the photocathode 3-4 adjacent to the partitioning wall 109. As shown in the figure, the time differences among the electron trajectories s, t, and u to impinge on the first dynode Dy1 are shortened though the emitting positions of the electrons from the photocathode 3 are different.

According to the multi-anode type photomultiplier tube of this embodiment, electrons can be guided to the first dynode Dy1 effectively regardless of the position of the incident light on the photocathode 3. The incident light can be detected uniformly over the entire photocathode 3. Additionally, the time difference among electrons traveling from the photocathode 3 to the first dynode Dy1 can be shortened.

As described above, in the multi-anode type photomultiplier tube 100 of the second embodiment, the anode 31 and the electron multiplying portion including the first dynode Dy1, the second dynode Dy2, and the dynode array 25 are provided in the glass container 5. The light incident on the photocathode 3 is multiplied by the electron multiplying portion and detected by the anode 31. The partitioning wall 109 having a cross shape extends from the photocathode 3 in the tube axis direction Z. The shield electrode 110 is provided below the partitioning wall 109. The partitioning wall 109 and the shield electrode 110 are maintained at the same potential as that of the photocathode 3. The opening space is provided between the partitioning wall 109 and the shield electrode 110. The aperture 112 is formed in the shield electrode 110.

According to the above structure, the electrons emitted from the photocathode 3 in response to the light incident thereon can be guided to the electron multiplying portion including the first and second dynodes Dy1 and Dy2.

The opening space 108 below the partitioning wall 109 and the aperture 112 in the shield electrode 110 assist in making the electric field in the space segments 5-1 to 5-4 uniform. Accordingly, the transit time differences among the electrons which emit from the photocathode 3 to impinge on the first dynode Dy1 can be reduced regardless of the positions on the photocathode 3 from which the electrons are emitted. When the photomultiplier tube is used for an image displaying device, a sharp image can be obtained.

A single deposition source (not shown) can be placed for the four space segments 5-1 to 5-4 in common in order to form the photocathode 3, because the opening space 108 is provided below the partitioning wall 109. Therefore, the number of components can be reduced.

Figure 10A:
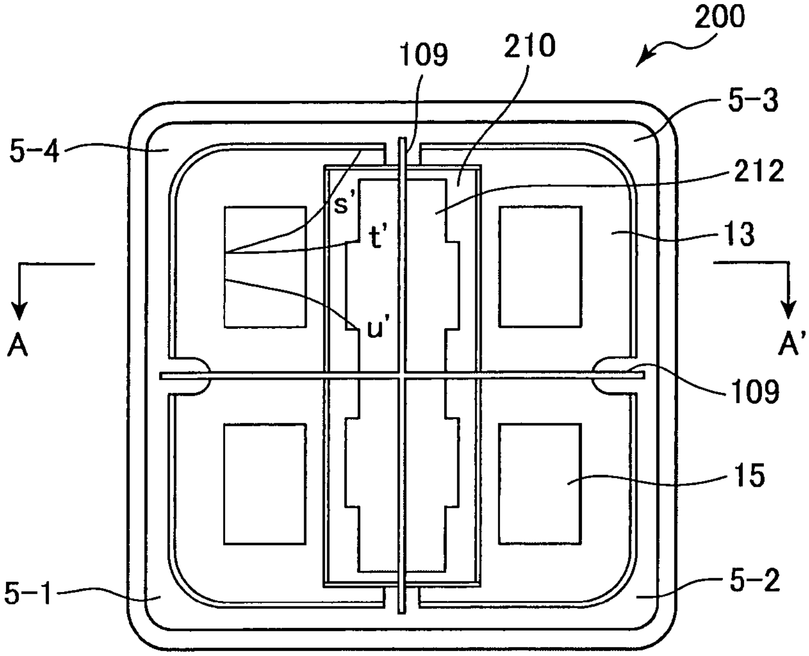
FIG. 10 shows electron trajectories in the multi-anode type photomultiplier tube 200 provided with a partitioning wall 109 and a shield electrode.
Figure 10B:
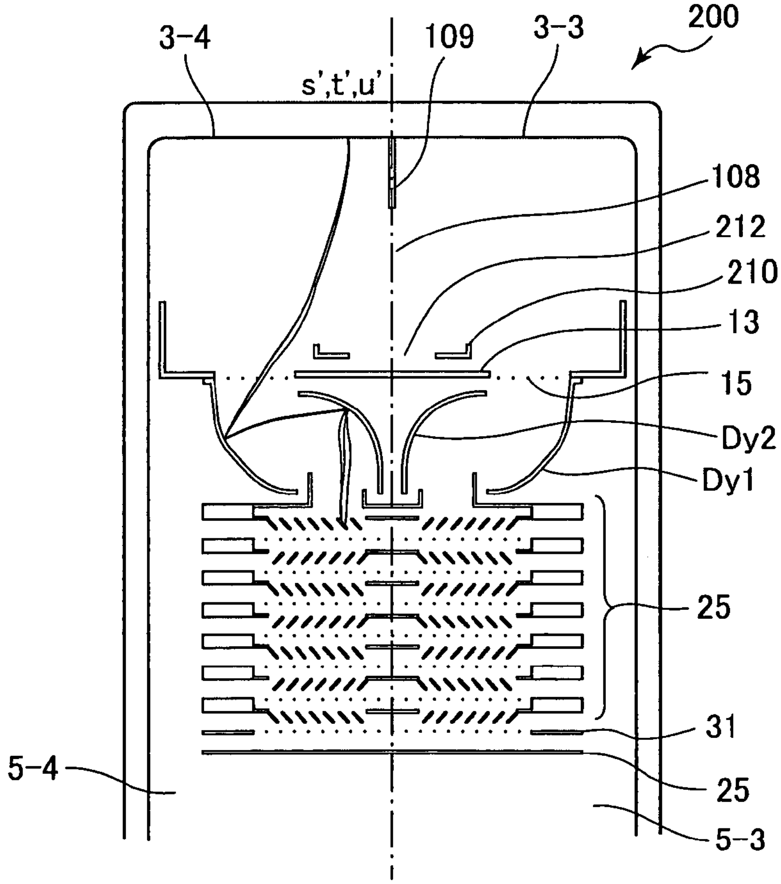

FIG. 10 shows a multi-anode type photomultiplier tube 200 as the modification of the second embodiment. FIG. 10 are views showing the structure of and electron trajectories in the multi-anode type photomultiplier 200 having a partitioning wall 109 and a shield electrode 210 above a flat electrode 13. FIG. 10(*a*) is a plan view of the multi-anode type photomultiplier 200 from above, and FIG. 10(*b*) is a sectional view taken along the line A-A' in FIG. 10(*b*).

In FIG. 10, the shield electrode 210 is substituted for the shield electrode 110 of the multi-anode photomultiplier tube 100. The other components are the same as those of the multi-anode photomultiplier tube 100.

The shield electrode 210 is made from an electrically conductive planer material, and positioned below the partitioning wall 109 and above the flat electrode 13 in the glass container 5. In this embodiment, a rise portion which extends toward the photocathode 3 is provided at the periphery of the shield electrode 210 to enhance the strength of the shield electrode 210. An aperture 212 is formed at the center of the shield electrode 212. The aperture has the barrel shape which has a wider portion in the vicinity of the center of each space segment 5-1 to 5-4. The shield electrode 210 is maintained at the same potential as that of the photocathode 3.

FIG. 10 shows electron trajectories s', t', and u' in the space segment 5-4 which are emitted from the photocathode 3-4 in the vicinity of the partitioning wall 109. As shown in the figure, the electron trajectories s', t', and u' impinge on the smaller area on the first dynode Dy1, compared with that of the electron trajectories s, t, and u. The transit time differences among the electrons which travel from the photocathode 3 to the first dynode Dy1 can be reduced, compared with those of the multi-anode type photomultiplier tube 100. The position of the electron impinging on the first dynode Dy1 is restricted within a small area.

According to the multi-anode type photomultiplier tube 200, the opening space 108 below the-partitioning wall 109 and the aperture 212 in the shield electrode 210 assist in making an electric field in the space segments 5-1 to 5-4 uniform. The transit time differences among the electrons to travel from the photocathode 3 to the first dynode Dy1 can be reduced, and deviation of the positions on the first dynode Dy1 on which the electrons impinge can be reduced. Therefore, when the photomultiplier tube is used for an image display device, a sharp image can be obtained.

As described above, photomultiplier tubes according to the preferred embodiments of the present invention are described while referring to the drawings. However, the present invention is not limited to the embodiments described above. Some modifications and improvements can be made by those skilled in the art within the scope of the claims.

The shield electrodes 11, 110, and 210 can be made without a rise portion. Therefore, it is possible to reduce an amount of the material to make the shield electrodes 11, 110, and 210, thereby lowering manufacturing costs.

The number of space segments 5-1 to 5-4 is not restricted to four, for example, the number of space segments can be nine consisting of a 3×3 matrix. In the latter case, the partitioning wall 9 can be provided in a grid manner depending on the arrangement of the space segments.

The aperture in the flat electrode 13 is not always provided with a mesh 15. Further, the vertical, horizontal, and diagonal portions of the first dynode Dy1 and the second dynode Dy2 can have a curved structure instead of a straight structure.

The screen focusing electrode 20 is not always necessary. The flat screen focusing electrode without the first and second screens 21 and 22 can be used.

The third dynode Dy3 need not extend beyond the first screen 21 towards the side tube 6. The third dynode Dy3 extends at least to a point below the first screen 21.

The dynode array 25 consists of a third to tenth dynodes. In another embodiment, the dynode array can have more or less than eight dynodes.

In the preferred embodiments, the dynode array 25 was described as a Venetian blind type. The dynode array can be a laminated structure dynode array such as a fine mesh, or a microchannel plate type. A box type or a linear-focus type dynodes can be used as a dynode as the third and higher order dynodes.

The shape of the glass container 5 is not restricted to be prismatic but can be cylindrical.

INDUSTRIAL APPLICABILITY

The multi-anode type photomultiplier tube of the present invention can be employed as positron CTs in the medical field. Further, the photomultiplier of the present invention can be used in a wide range of fields in order to detect radiation and light.

What is claimed is:

1. A multi-anode type photomultiplier tube comprising:

a faceplate made from glasses having an inner surface;

a side tube made from glass and having a hollow shape extending in a tube axial direction which is substantially perpendicular to the faceplate, the side tube being joined to the faceplate;

a photo cathode formed on the inner surface of the faceplate in the side tube to emit a photoelectron in response to light incident on the faceplate, the photocathode having a plurality of regions, each of the plurality of regions being defined by a boundary therebetween;

a partitioning wall having a predetermined length extending from the boundary along the tube axial direction;

a plurality of electron multiplying portions provided in the side tube, the plurality of electron multiplying portions corresponding to the plurality of regions on the faceplate for multiplying the photoelectron emitted from the photocathode; and a plurality of anodes provided in the side tube, the plurality of anodes corresponding to the plurality of regions on the photocathode for receiving an electron emitted from the plurality of electron multiplying portions, wherein each of the plurality of electron multiplying portions includes:

a first dynode provided in the vicinity of the side tube for multiplying the photoelectron impinging thereon from the photocathode to emit a secondary electron; and a second dynode provided in the vicinity of the tube axis for multiplying the secondary electrons impinging thereon from the first dynode to emit secondary electrons;

wherein the multi-anode photomultiplier tube further comprises:

a shield electrode provided between the second dynode and the photocathode for shielding the second dynode from the photocathode;

the photocathode, the partitioning wall, and the shield electrode are maintained at a same potential.

2. The photomultiplier tube according to claim 1, wherein the shield electrode has an aperture, thereby adjusting an electric field in the side tube to reduce transit time differences among electrons which are emitted from the photocathode to impinge on the first dynode.

3. The photomultiplier tube according to claim 1, further comprising a flat electrode provided between the shield electrode and the second dynode, the flat electrode having an aperture which enables an electron to pass therethrough to the first dynode.

4. The photomultiplier tube according to claim 3, wherein the shield electrode has an aperture, thereby adjusting an electric field in the side tube to reduce transit time differences among electrons which are emitted from the photocathode to impinge on the first dynode.

5. The photomultiplier tube according to claim 3, wherein the aperture of the flat electrode is provided with an electrically conductive mesh member.

6. The photomultiplier tube according to claim 3, wherein the shield electrode has an aperture, thereby adjusting an electric field in the side tube to reduce transit time differences among electrons which are emitted from the photocathode to impinge on the first dynode.

7. The photomultiplier tube according to claim 3, wherein the flat electrode is maintained at a potential which is higher than a potential of the first dynode and less than or equal to a potential of the second dynode.

8. The photomultiplier tube according to claim 7, wherein the shield electrode has an aperture, thereby adjusting an electric field in the side tube to reduce transit time differences among electrons which are emitted from the photocathode to impinge on the first dynode.

9. The photomultiplier tube according to claim 5, wherein the flat electrode is maintained at a potential which is more than or equal to a potential of the first dynode and less than a potential of the second dynode.

10. The photomultiplier tube according to claim 9, wherein the shield electrode has an aperture, thereby adjusting an electric field in the side tube to reduce transit time differences among electrons which are emitted from the photocathode to impinge on the first dynode.

11. The photomultiplier tube according to claim 1, wherein the second dynode comprises a curved portion for multiplying the photoelectron impinging thereon and a back portion, and two second dynodes in adjacent two of the plurality of electron multiplying portions are positioned to be joined together through the back portions thereof.

* * * * *